(No Model.)
F. J. HENRICHSEN.
BROADCAST SEEDER.
No. 407,657. Patented July 23, 1889.
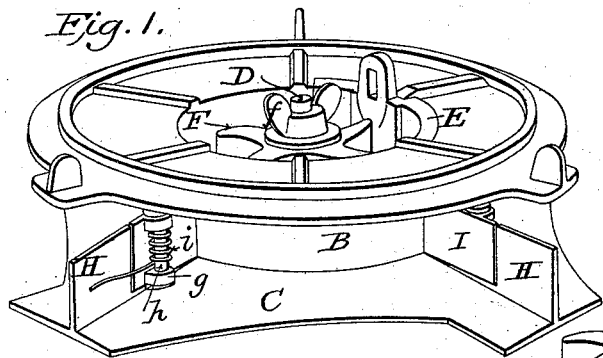
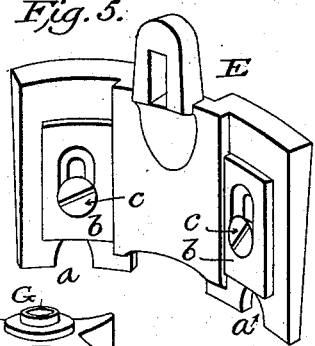
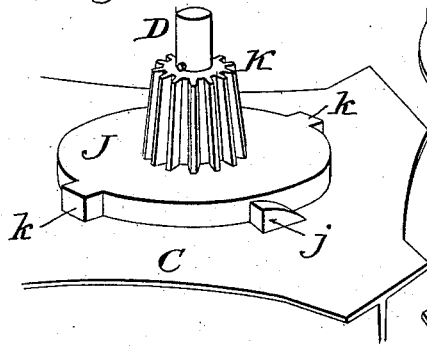
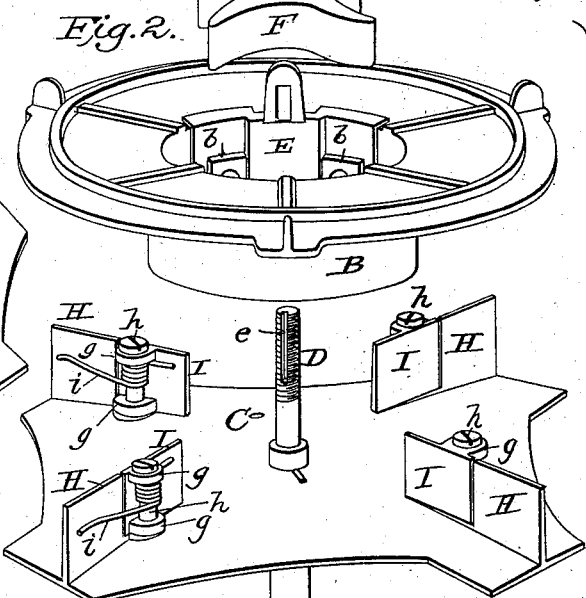
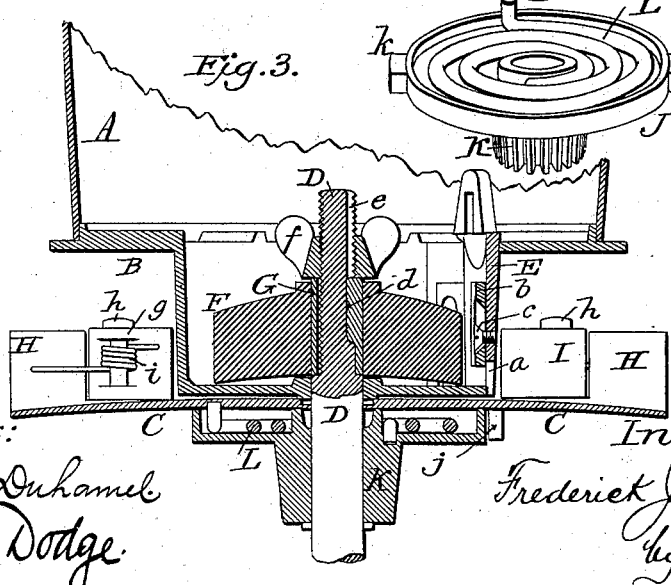
Witnesses:
James F. Duhamel
Horace A. Dodge
Inventor:
Frederick J. Henrichsen
by Dodge & Son
Attys.

UNITED STATES PATENT OFFICE.

FREDERICK J. HENRICHSEN, OF RACINE, WISCONSIN, ASSIGNOR TO THE HENRICHSEN MANUFACTURING COMPANY, OF SAME PLACE.

BROADCAST SEEDER.

SPECIFICATION forming part of Letters Patent No. 407,657, dated July 23, 1889.

Original application filed December 22, 1888, Serial No. 294,355. Divided and this application filed June 24, 1889. Serial No. 315,377. (No model.)

*To all whom it may concern:*

Be it known that I, FREDERICK J. HENRICHSEN, a citizen of the United States, residing at Racine, in the county of Racine and State of Wisconsin, have invented certain new and useful Improvements in Broadcast Seeders, of which the following is a specification.

My invention relates to broadcast seeders; and it consists in a novel construction and arrangement of parts, hereinafter set forth.

In the drawings, Figure 1 is a perspective view of my improved distributer; Fig. 2, a perspective view of the parts separated; Fig. 3, a vertical sectional view; Fig. 4, a perspective view of the bottom of the distributer, and Fig. 5 a perspective view of the adjustable distributing gate or slide.

A indicates the upper hopper, secured to or formed upon the lower hopper B, and C indicates the distributing-plate, secured to the upright shaft D, as shown in Fig. 3.

Fitting into the upright wall of the hopper B is a slide or plate E, which is designed to cover openings in the hopper-wall and to regulate and control the discharge of seed from the hopper. The slide is provided with notches or openings $a$ in its lower edge, to which are applied slotted plates $b$, adjustably secured to the inner face of the slide by means of a screw $c$. By adjusting the plates upon the slide, and the slide as a whole relatively to the hopper, a nicety of adjustment is secured.

Mounted upon the shaft D within the hopper is a wheel or agitator F, the arms and body of which are made of rubber or other elastic material, which during rotation will not bruise the seed or grain within the hopper. This rubber wheel is provided with a metal bushing G, having a rib $d$, cast integral therewith, which rib is adapted to fit into a groove $e$ in shaft D, as shown in Fig. 3, said wheel being held in position upon the shaft by means of a thumb-nut $f$, screwing upon the end of shaft D, as shown. This distributing-plate C, to which I have referred, is provided on its upper face with radial wings or blades H, provided at their inner ends with hinged or pivoted gates I, which terminate close to the outer walls of the hopper B.

The gates are provided with perforated lugs $g$, through which passes a bolt or stem $h$, secured to the plate C, as shown.

The bolt is encircled by a coiled spring $i$, the ends of which bear upon the wing H and gate I in such manner that the latter is held normally in line with the wing close up to the hopper, but is permitted to yield in case stones, nails, or other foreign matters find their way into the machine, thereby preventing breakage of the parts.

Cast upon or otherwise secured to the under side of the plate C are lugs $j$, with which lugs $k$, secured or formed upon a clutch-case J, are adapted to engage. This case J is formed with a bevel gear-wheel K, to which motion may be imparted in any suitable manner, said case and its wheel being mounted loosely upon the shaft D, so as to permit a limited movement thereon.

The degree of movement will of course be limited by the lugs $j\ k$, which latter, when in engagement, lock the distributer-plate C to the case J and thereby cause the rotation of the plate.

In order to take up the jar due to the initial movement or starting up of the machine, I place within the case or shell J a coiled spring L, one end of which is secured to the shell J and the other end to the plate C. On motion being imparted to the wheel K, the case J is moved or turned slightly, and the strain due to sudden starting of the machine taken up by the spring L, which latter will be coiled up until the lugs $k$ strike the lugs $j$, and when this plate C and case J and wheel K are thus locked together, further rotation of the wheel K will cause a corresponding movement of the distributing-plate C.

No broad claim is made herein to an elastic feeding device, a clutching mechanism, nor to an adjustable gate or slide, the present invention relating to certain improvements of these features, whereby an efficient and compact machine is produced. By reason of the bottom of the hopper B being closed, no seed, particularly fine grass seed, is permitted to enter between said hopper and plate C and be thereby ground.

It is clear that the case or shell J may be omitted, in which case the wheel K would be provided with two arms, which would serve as lugs to engage the lugs $j$ on the plate C.

In use the hoppers A B are secured rigidly in position, and the shaft or axle D is supported at its lower end by a socket or bearing. (Not shown.)

The device herein shown is designed to be applied to the rear end of a wagon and receive motion from the driving-wheel thereof, through intermediate connections (not shown) and forming no part of the present invention.

The thread cut upon the upper end of the shaft or axle D is preferably a left-hand thread, so that any tendency there might be of the thumb-screw to loosen during the rotation of the feeding-wheel is obviated.

Instead of employing precisely the construction of spring hinge-joint shown between the wings or blades and the gates, any equivalent form of joint may be used.

No broad claim is made herein to the combination, with a hopper and a shaft, of an elastic feed-wheel having arms or fingers, as that forms the subject-matter of an application filed by me December 22, 1888, Serial No. 294,355, of which case this application is a division.

Having thus described my invention, what I claim is—

1. In a broadcast seeder, the combination, with a shaft D, of a distributing-plate C, and a hopper B, mounted directly above the plate and provided with a closed bottom.

2. In combination with a hopper B, having a closed bottom and a lateral seed-outlet, a shaft or axle extending upward through the bottom of the hopper, a feed-wheel secured to said shaft within the hopper, and a distributing-plate also secured to the shaft and placed directly beneath the hopper.

3. In a broadcast seeder, the combination, with the hopper and the shaft journaled therein, of the plate C, provided with yielding ribs.

4. In a broadcast seeder, the combination, with the hopper and the shaft journaled therein, of the plate C, provided with wings or ribs having yielding ends or gates.

5. In a broadcast seeder, the combination, with the hopper and the shaft journaled therein, of the plate C, provided with wings H, gate I, provided with lugs $g$, bolt $h$, passing through the lugs, and spring $i$, bearing at opposite ends against the wing and gate.

6. The combination, in a broadcast seeder, of the grooved shaft D, of the elastic feed-wheel, the metallic bushing, spline, or feather $d$, and means for securing the wheel in position.

7. In a broadcast seeder, the combination, with threaded shaft D, provided with groove $e$, of elastic wheel F, metallic bushing G, provided with spline $d$, and a thumb-nut $f$, applied to the shaft.

8. In a broadcast seeder, the combination, with a shaft, of a distributing-plate C, secured rigidly thereto, a gear-wheel K, provided with a lug $k$ to engage a lug $j$ on the plate, and a spring L, secured at opposite ends to the wheel and case.

9. In a broadcast seeder, the combination, with a shaft and a distributing-plate secured thereto, of a gear-wheel adapted to engage the plate, and a spring secured to the plate and the gear-wheel, whereby the spring is adapted to take up initial movement of the wheel.

10. In a broadcast seeder, the combination, with a hopper B, and a shaft D, extending upward therethrough, of a feed-wheel mounted upon the shaft within the hopper, a distributing-plate also mounted upon the shaft and provided with wings or blades, a gear-wheel mounted loosely upon the shaft and provided with lugs adapted to engage the plate, and a spring secured to the wheel and plate whereby the initial movement of the gearing may be taken up by the spring.

In witness whereof I hereunto set my hand in the presence of two witnesses.

FREDERICK J. HENRICHSEN.

Witnesses:
H. J. REYNOLDS,
E. G. DURANT.